US005482144A

United States Patent [19]
Vranish

[11] Patent Number: 5,482,144
[45] Date of Patent: Jan. 9, 1996

[54] THREE-DIMENSIONAL ROLLER LOCKING SPRAGS

[75] Inventor: John M. Vranish, Crofton, Md.

[73] Assignee: The United States of America as represented by the Administrator of National Aeronautics and Space Administration, Washington, D.C.

[21] Appl. No.: 280,979

[22] Filed: Jul. 27, 1994

[51] Int. Cl.⁶ .................................................. F16D 41/07
[52] U.S. Cl. .................................................. 188/6; 192/45.1
[58] Field of Search ........................... 188/6, 82.2, 82.3, 188/82.84, 82.8; 192/41 A, 45.1

[56] References Cited

U.S. PATENT DOCUMENTS

| | | | |
|---|---|---|---|
| 3,164,234 | 1/1965 | Tamarin | 192/45.1 |
| 3,326,342 | 6/1967 | Hack | 192/45.1 |
| 3,819,019 | 6/1974 | Timtner | 192/45.1 |
| 4,162,000 | 7/1979 | Zlotek | 192/45.1 |
| 4,635,771 | 1/1987 | Shoji et al. | 192/45.1 |
| 4,770,054 | 9/1988 | Ha | 192/45.1 |
| 5,064,037 | 11/1991 | Long, Jr. | 192/45.1 |
| 5,335,761 | 8/1994 | Leitz | 192/45.1 |

FOREIGN PATENT DOCUMENTS 1580076   7/1990   U.S.S.R. .

Primary Examiner—Robert J. Oberleitner
Assistant Examiner—Chris Schwartz
Attorney, Agent, or Firm—Robert D. Marchant

[57] ABSTRACT

A torque coupling sprag system which provides contact between the sides of at least one groove and at least two contact surfaces angled with respect to the central axial direction of at least one rotatable 3-D sprag member located between a drive member and a reaction member. The surface contacts between the members include various combinations of surface segments arranged in a predetermined manner to define a desired configuration. The contact radius of the 3-D sprag member is significantly larger than its rolling radius; however, radii can be varied in size and shape independently of each other, particularly the contact radius.

27 Claims, 3 Drawing Sheets

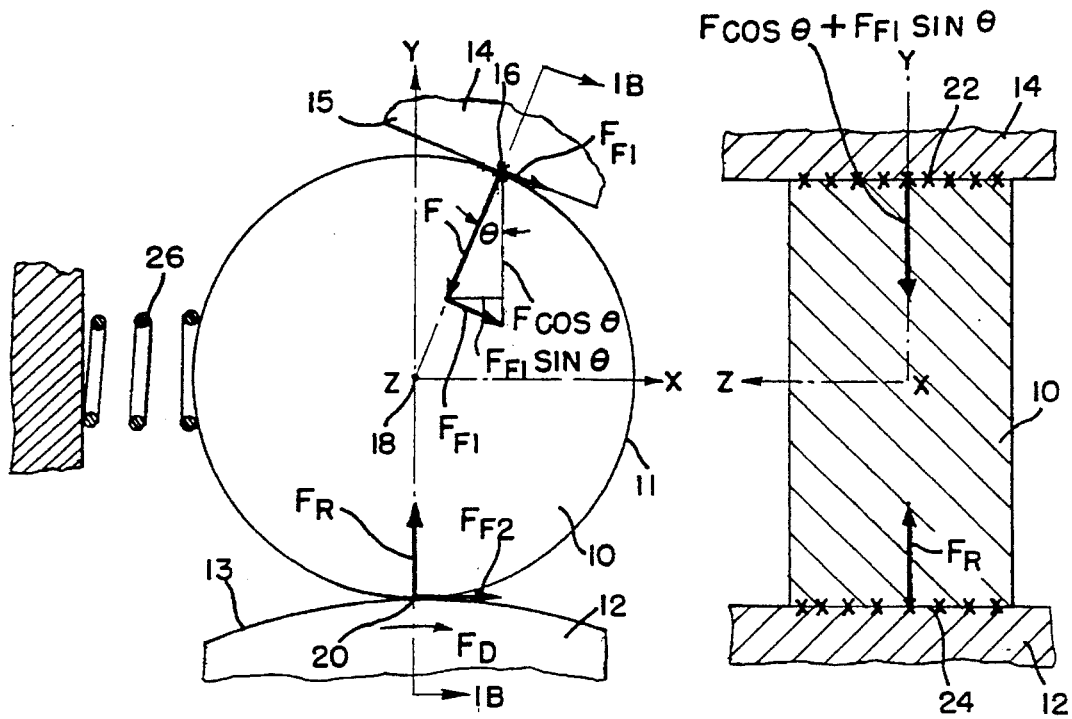
FIG.1A
PRIOR ART
FIG.1B
PRIOR ART
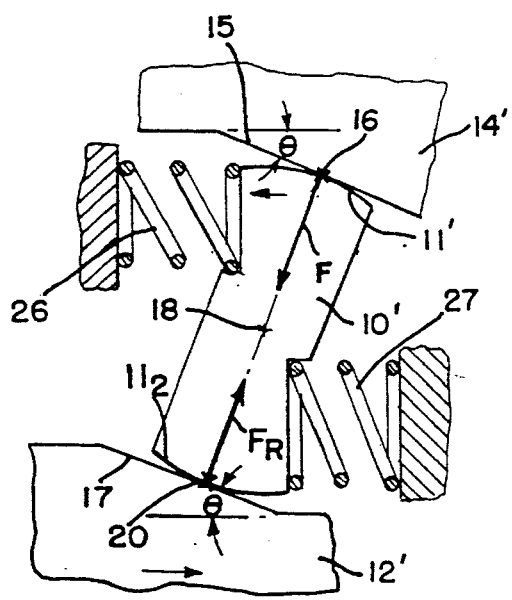
FIG. 2
PRIOR ART
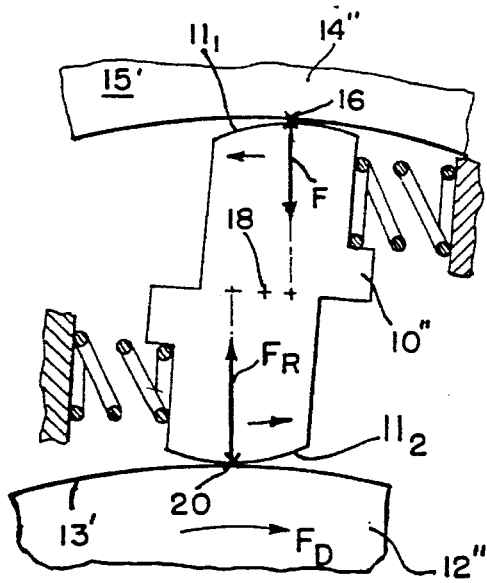
FIG. 3
PRIOR ART

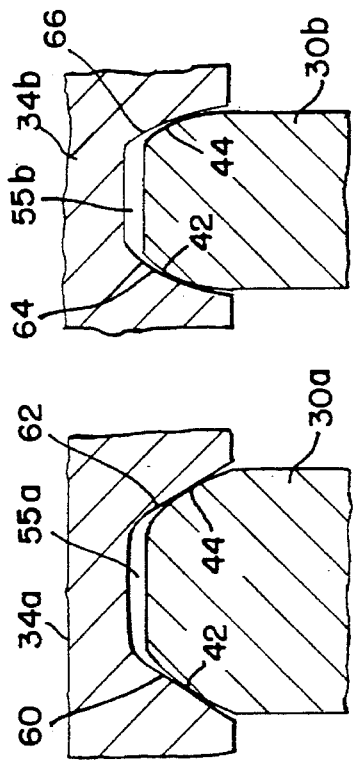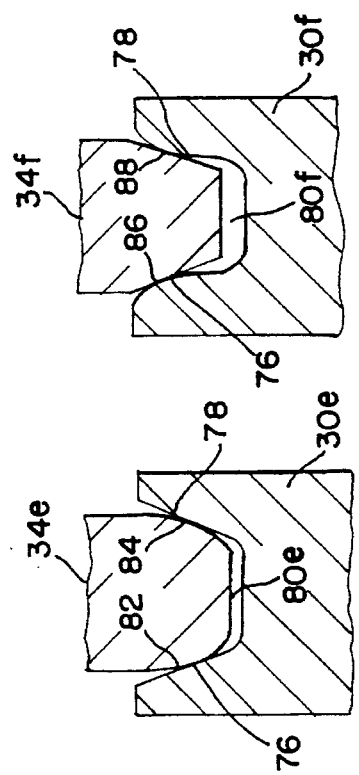

1

THREE-DIMENSIONAL ROLLER LOCKING SPRAGS

ORIGIN OF THE INVENTION

This invention was made by an employee of the United States Government and may be used by or for the Government for governmental purposes without the payment of any royalties thereon or therefor.

1. Field of the Invention

This invention relates generally to mechanical brake and clutch devices and more particularly to roller type locking sprag devices which operate to couple torque between a drive member and a reaction or fixture member.

2. Description of the Prior Art

Locking techniques using ball or roller members are well known and have been used extensively in various types of clutch mechanisms. In such apparatus, the motion of one member, referred to as a driver member, forces a ball or roller to wedge against an inclined surface of another member, referred to as a reaction or fixture member. A sprag, to which the present invention is directed, comprises a roller having a line contact bearing surface as opposed to a point contact surface of a ball and is used where relatively large loads and contact stresses are encountered. Sprags typically have mutually opposing or slightly offset two dimensional cylindrical contact surfaces located between a drive surfaces located between a drive member and a reaction member and having a body which comprises a portion of a roller and which are spring biased against the contact surface of the drive member and the reaction member.

Known prior art type sprags typically have relatively small cam angles or inclines, normally on the order of 6. Thus, they must have relatively large contact stresses in order no generate sufficient holding torque when transferring torque from the drive member to the reaction member. The combination of these large contact stresses and the small cam angles requires large radial forces which in turn, force the walls of the device to be thick and long. It also forces the sprags to be relatively long. This results in sprag devices utilized, for example, in over-running clutches, to be heavier and bulkier than necessary. Also, the machining tolerances on the cams must be very close because if a 6° cam is machined too closely, the roller tries to move over center and jams to the point where it will not come out and excessive forces in clutch damage may result. If, on the other hand, the cam angle of the incline surface is too large, such as being greater than 6°, the clutch will slip. For example, in space where the coefficient of friction can vary by as much as 25%, a 6° cam can be vulnerable in its utilization.

SUMMARY

It is an object of the present invention, therefore, to provide an improvement in roller type locking brakes and clutches.

It is another object of the invention to provide an improvement in roller-type locking sprag systems.

It is a further object of the invention to provide a sprag system which is more effective and reliable in its ability to provide a lock-up between a drive member and a reaction member.

It is yet another object of the invention to provide a sprag member which is relatively shorter in axial length than conventional sprags without any sacrifice in performance.

It is yet a further object of the invention to overcome the requirement of relatively thick and long sprag members resulting from large contact stress and small cam angles.

It is still a further object of the invention to provide a three-dimensional sprag system having at least one sprag member which is confined to a groove so that it cannot migrate axially between a drive member and a reaction member.

Briefly, the foregoing objects and advantages are realized by a torque coupling sprag system which is three-dimensional in nature where the change is effected from a cylindrical type sprag contact to a contact between the sides of at least one groove and at least two contact surfaces angled with respect to the central axial direction of at least one sprag member located between a drive member and a reaction member. The sprag member is rotatable between the reaction member and the drive member, which have an angle therebetween defined by a straight line passing through a central rotatable axis and a first pair of contact surfaces on the drive member and a straight line passing through the central axis and a second pair of contact surfaces on the reaction member. The surface contacts between the members include various combinations of diametrically opposed flat and curved contact surface segments arranged in a predetermined manner to define a desired configuration.

BRIEF DESCRIPTION OF THE DRAWINGS

The following detailed description of the invention will be more readily understood when considered together with the accompanying drawings wherein:

FIG. 1A is a side elevational view of a typical known prior art sprag device;

FIG. 1B is a cross sectional view of the embodiment shown in FIG. 1A taken along the lines 1B—1B thereof;

FIGS. 2 and 3 comprise side elevational views illustrative of other prior art sprag devices;

FIGS. 7A—7D are partial cross-sectional views illustrative of a first set of modified versions of the embodiment shown in FIGS. 4A and 4B including male type sprags and female type fixtures;

FIGS. 8A—8D are cross-sectional views of a second set of modified versions of the embodiment shown in FIGS. 4A and 4B including female type sprags and male type fixtures.

DETAILED DESCRIPTION OF THE INVENTION

Figure 4A:
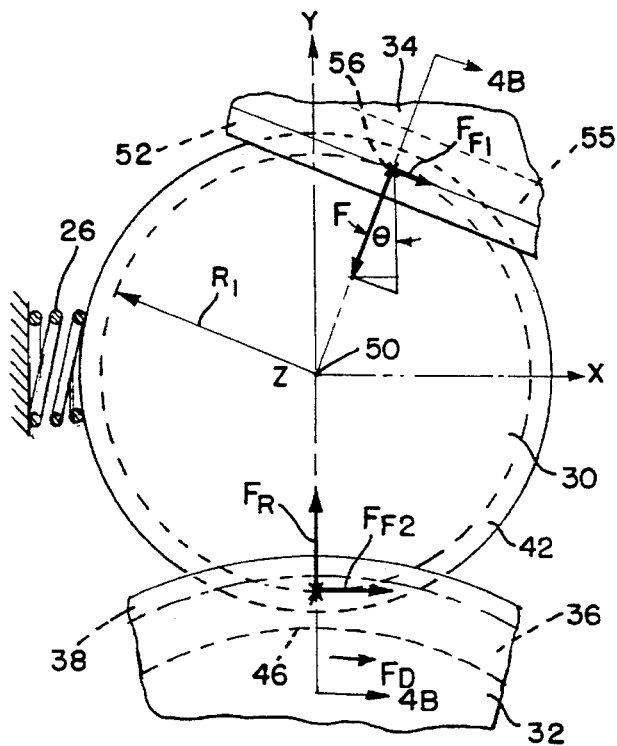
FIG. 4A is a side elevational view of a first embodiment of the subject invention.

Referring now to the figures wherein like reference numerals refer to like parts throughout, reference will first be made to FIGS. 1A and 1B which are illustrative of a conventional two-dimensional (2-D) roller locking sprag arrangement comprising a cylindrical type sprag member 10 located between a rotary type drive member 12 and a rotary type reaction member 14, which may also be referred to as a fixture. The reaction member or fixture 14 has an inclined roller contact or cam surface 15 which is inclined at an angle θ with respect to a Y axis of an orthogonal X, Y, Z axis system passing through the center of the sprag member 10 and which makes contact therewith at contact point 16. The sprag member 10 also makes contact with the driver member 12 at contact point 20.

As depicted in FIG. 1B, the sprag member 10 has a thickness dimension along the Z axis which results in contact with the driver and reaction members 12 and 14 along the lines 22 and 24. The contact point 16 shown in FIG. 1A lies along the line 22 and the contact point 20 on the line 24. Further, the sprag member 10 is spring biased against the drive member 12 and the reaction member 14 by a preload spring member consisting of a compression spring 26 causing tangential frictional forces to build up along the contact surface lines 22 and 24 between the surfaces 11, 13 and 15.

in operation, torque is coupled from the drive member 12 to the reaction member 14 when, as shown in FIG. 1A, the drive member 12 rotates in a clockwise direction. This causes the sprag member 10 to rotate around the Z axis in a counterclockwise direction and roll up the inclined surface 15 of the reaction member 14. The sprag member 10 will wedge itself between the reaction member 14 and the drive member 12 with frictional forces $F_{F1}$ and $F_{F2}$ developing, at which time lock-up occurs and the torque provided by the drive member 12 will be transferred or coupled to the reaction member 14 which will then also rotate in a clockwise direction along with the drive member 12.

At lock-up, in addition to the frictional forces $F_{F1}$ and $F_{F2}$, there exists a force F which is applied by the reaction member 14 to the sprag member 10 directed toward the Z axis and normal to the inclined surface 15 as well as a reaction force directed from the driver member 10 directed along the Y axis. Further at such time the summation of the forces along the X axis and Y axis and the moments about the Z axis are all equal to zero.

Referring to FIGS. 1A and 1B, these relationships can be expressed as follows. For the summation of forces along the X axis:

$$\Sigma F_x = 0 \quad (1)$$

and it can be shown that $$F \sin \theta = F_{F1} \cos \phi + F_{F2} \quad (2)$$

With respect to the forces along the Y axis, $$\Sigma F_y = 0, \quad (3)$$

and $$F \cos \theta + F_{F1} \sin \theta = F_R \quad (4)$$

With respect to the moments about the Z axis, they are also equal to zero, such that, $$\Sigma M_z = 0, \quad (5)$$

therefore $$F_{F1} = F_{F2} \quad (6)$$

Typically sprag clutches are designed such that $F_{F2}$ slips first during unlocking of the elements 10, 12 and 14, then $$F_{F2} = F_R \mu s \quad (7)$$

where $\mu s$ is a coefficient of friction between the sprag member 10 and the driver member 12.

Using equations (2), (6) and (7), it can be further shown that $$F \sin \theta = F_{F2} (1 + \cos \theta) = F_R \mu s (1 + \cos \theta) \quad (8).$$

Accordingly, $$F \sin \theta / F_R (1 + \cos \theta) \leq \mu s \quad (9)$$

Depending upon the value of $\mu s$ which is a limit indicative as to when slippage occurs, the maximum angle of $\theta$ is governed by the relationship as expressed in equation (9) and for 2-D sprags (FIGS. 1A and 1B). The sprags are normally operated in a lubricant. Accordingly, $\mu s$ is small resulting in a small $\theta$, typically on the order of 6°.

Prior to considering the embodiments of the subject invention, reference will first be made to FIGS. 2 and 3 which are illustrative of 2-D sprag systems which utilize only a partial section of a cylindrical roller. As shown in FIG. 2, the sprag member 10' comprises a body member having a pair of curved surfaces $11_1$ and $11_2$ which respectively contact the inclined surfaces 15 and 17 of the reaction member 14' and the drive member 12' at contact points 16 and 20, respectively. In this embodiment, both inclined surfaces 15 and 17 have equal cam angles (8). It should be noted, however, that these cam angles do not have to be equal. They are shown as such for the sake of simplicity and thus are not meant to be limited thereto.

Now instead of having a single preload bias spring 26 as shown in FIG. 1A, the sprag member 10' of FIG. 2 includes a second preload spring 27 so that a spring bias is applied above and below the center or pivot point 18. The configuration of FIG. 2 is one in where a linear motion of the sprag member 12' is transferred or coupled to the reaction member 14' This is due to the fact that when the sprag member 12' moves to the right as shown, the surface 112 of the sprag member 10' rolls up the incline surface 17 and in doing so, the upper curved surface 111 rolls up the incline surface 15 of the reaction member 14', causing it to lock-up in a conventional manner. A movement of the drive member 12' in the opposite direction releases the coupling between the drive member 12' and the reaction member 14' as the sprag member 10'.

Referring now briefly to FIG. 3, it includes a sprag member 10" which is structurally similar to that shown in FIG. 2, with the exception that rather than the contact points 16 and 20 being aligned with the pivot 18, in the configuration shown in FIG. 2, offset radii are contemplated and as a result, the contact points 16 and 20 are mutually offset from one another on either side of the pivot 18. Also, the contact surfaces between the sprag member 10" and the drive member 12" and the reaction member 14" are curved surfaces as shown by reference numerals 13' and 15'.

Figure 4B:
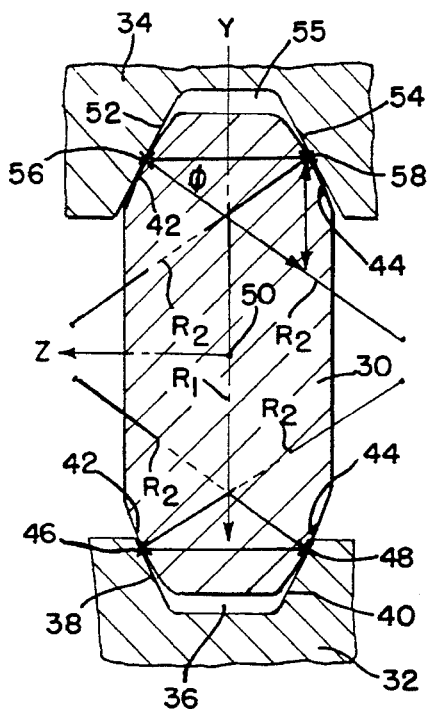
FIG. 4B is a cross sectional view illustrative of the embodiment shown in FIG. 4A taken along the lines 4B—4B thereof.

Directing attention now to the preferred embodiments of the subject invention, FIGS. 4A and 4B are illustrative of a torque coupling system where the driver member 32 and the incline, i.e. the reaction member 34 are both grooved and the sprag member 30 rolls along a path common to both grooves, with two side surfaces of the sprag member making contact with diametrically opposing sides of the grooves.

As illustrated in FIG. 4B, the drive member 32 includes a groove 36 having a pair of mutually diverging side wall surfaces 38 and 40 which contact a pair of curved peripheral side surfaces 42 and 44 of the sprag member 30. The pair of side wall surfaces 42 and 44 of the sprag member 30 contact the side wall surfaces 38 and 40 of the driver member 32 in the diametrically opposing regions 46 and 48 and which are located at a radius $R_1$ from the rotational or Z axis 50 which forms one of the three mutually orthogonal axes X, Y and Z in FIGS. 4A and 4B. The curved peripheral side surfaces 42 and 44 of the sprag member 30 also contact a pair of mutually diverging side wall surfaces 52 and 54 of a groove 55 formed in the body of the reaction member 34. The peripheral contact surfaces 42 and 44 contact the side walls 52 and 54 in the diametrically opposing regions 56 and 58 which are also located at the radius $R_1$ of the drive member 32.

Further, as shown in FIG. 4B, both pairs of side wall surfaces 38, 40 and 52, 54 of the driver member and reaction member, respectively, are of the same type, i.e. flat surfaces which respectively contact curved, i.e. convex peripheral side wall surfaces 42 and 44 of the sprag member 30. It should be noted that the radius of curvature $R_2$ of the surfaces 42 and 44 is extremely large relative to $R_1$. This permits the sprag member 30 to roll in the grooves 36 and 55 of the drive and the reaction members 32 and 34 via pairs of mutually opposing contact surfaces.

What is provided is a three-dimensional (3-D) sprag device but which now involves a second angle $\phi$ as shown in FIG. 4B. The angle $\phi$ is the angle between a line between the points of contact 46, 48 and 56, 58 and radius of curvature $R_2$ and defines both the angle of the grooves 36 and 55, and the angle of the contact surfaces 42 and 44 of the sprag member 30.

In such a configuration, the reaction force $F_R'$ now includes a term $\sin \phi$ and which can be expressed as $F_R$ and where, $$F'_R = FR/\sin \phi \tag{10}$$

in which case, equation (9) is now expressed as, $$(F \sin \theta)(\sin \phi)/F_R(1+\cos \theta) \leq \mu's \tag{11}$$

where $\mu$'s is the coefficient of friction for the 3-D embodiment (FIGS. 4A and 4B) and, therefore $$\mu'_s = \mu_s/\sin \phi. \tag{12}$$

This indicates that the angle $\theta$ for a 3-D embodiment can be inherently larger than the angle $\theta$ for a 2-D configuration as shown in FIGS. 1A and 1B.

This also means that the locking capabilities of a 3-D roller type sprag member such as shown in FIG. 4B is improved by a factor of $1/\sin\phi$. For a contact angle of $\theta=30°$, for example, this effectively doubles the locking effectiveness. This locking effectiveness can be utilized in, for example, three different ways. If the angle $\theta$ of the incline and the coefficient of static friction ($\mu$'s) remain the same, the margin of safety and reliability of locking over slipping increases several times depending upon the sprag-groove contact angle. On the other hand, one can obtain the same margin of safety and reliability and using different materials and more slippery lubricants without penalty. That is, the static coefficient of friction can be reduced or in some ways relaxed. The third way of utilizing and improving locking effectiveness is to increase the angle $\theta$ of the incline while keeping the static coefficient of friction $\mu_S$ the same. This has the effect of increasing the torque output of a brake/clutch device employing locking sprags without increasing the contact stresses on the sprags.

At the same time, very compact 3-D sprags can withstand very large forces and still maintain modest contact forces. Contact stresses for a point contact between 2 spheres on which one sphere is inside the other are calculated as shown in equation (13) below:

$$P_o = (1/R_1 - 1/R_2)(E/2)^2 p]^{1/3} \tag{13}$$

where:

$P_o$ is the contact stresses,
$R_1$ is the inside radius (sprag),
$R_2$ is the outside radius (groove),
$E$ is the materials modulus of elasticity and
$P$ is contact load.

With 3-D sprags, the contact radius $R_2$ as shown in FIG. 4B acts against a flat surface, for example 52 and 54, as shown; however, $R_2$ is independent of the sprag roll radius $R_1$ in FIG. 4A. Thus $R_2 >> R_1$ without effecting the size of the sprag 30. $R_2$ in FIG. 4B corresponds to $R_1$ in the equation (13) and the flat grooves in FIG. 4B correspond to $P_2$ in the equation where $R_2 \to \infty$.

Thus with a very large contact radius operating against an opposing e.g. flat surface, very large forces can be withstood with minimal contact stresses. Studies have shown that if one uses, $$P_o = 2[(1/R_1 - 1/R_2)(E/2)^2 P]^{1/3} \tag{14}$$

a conservative approximation is obtained (within 10%) in the 3-D sprag case.

It is clear that $P_o$ can be kept very small despite large P loads and this entirely independent of the sprag roll radius $R_1$.

Furthermore, a 3-D sprag geometry has significant advantages in the performance of both the inner disk or driver member 32 and the outer ring or reaction member 34 in FIGS. 4A and 4B respectively. The 2-D case of FIG. 1A and FIG. 1B shows a convex surface of a 2-D sprag 10 bearing on a convex surface of an inner disk 13. This arrangement is inherently prone to large stress concentrations and is somewhat analogous to $P_o$ in equation (13). Therefore, it is not surprising that, classically, the inner disk/sprag surface is the weak point of sprag clutch/brake devices.

With 3-D sprag techniques, however, this problem is by passed. The dominant effect is a convex sprag surface bearing, for example, against a flat or curved reaction or driver surface, with the radius $R_2$ of the sprag surface as large as desired, thus keeping the contact stresses low as permitted in the previously shown equation (14).

The 3-D sprag geometry also presents advantages for the outer ring or reaction member. In the 2-D geometry, the reaction member 14 (FIG. 1A), 14' (FIG. 2), and 14'' (FIG. 3) must be made both long in axial length and thick to guard against bending deformations brought about by the very large bearing forces. Elastic (and plastic) bending deformations are caused, in large part, by the geometric moment of inertia of the cross section of this member. In the case of the 2-D sprag, this is a long, narrow rectangle which has as its rotational center, a line through the center of the rectangle in the axial direction. This geometry is very weak in bending. Increasing the axial length, a linear function does little to help; thickness, a cubic function, is required. In the 3-D sprag case, the flange thicknesses of the reaction member 34 (FIG. 4B) which comprise the contact surfaces with the sprag member 30 provide this thickness and thus this geometry is very resistant to bending deformations. This results despite it being relatively short in axial length and despite very thin walls in the region between the outer limit of the groove 56 and the outside of the reaction member 34. Also, 3-D geometry permits thick flanges without requiring a corresponding increase in the overall diameter of the device.

Figure 5:
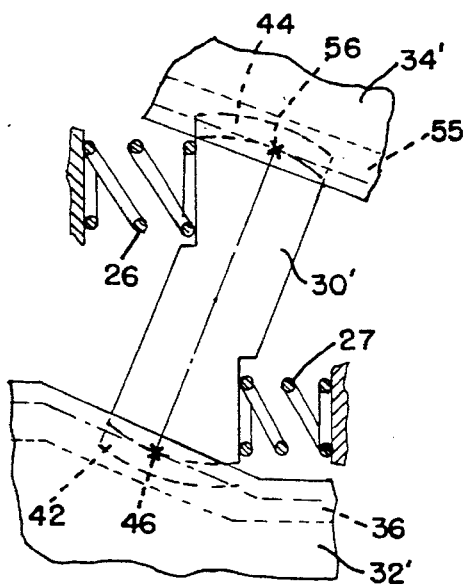
FIGS. 5 and 6 are side elevational views of second and third embodiments of the subject invention.
Figure 6:
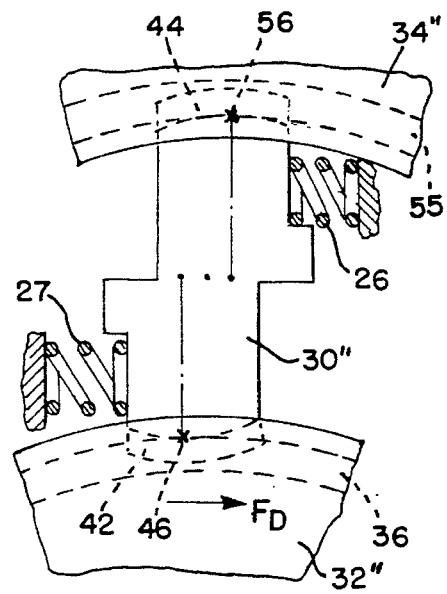

Further, all that is required to convert a 2-D sprag device to a 3-D device is to change from cylindrical contact as shown in FIG. 1B to a contact between diametrically opposing sides of the grooves and four contact surfaces angled with respect to the axial direction of the sprags as shown in FIG. 4B. Thus the 2-D configurations of FIGS. 2 and 3 can be converted to 3-D configurations as shown in FIGS. 5 and 6 by the inclusion of grooves 36 and 55 in the drive member 32' and reaction member 34' of the configuration of FIG. 5 and grooves 36 and 55 in the drive member 32" and the reaction member 34" in the configuration shown in FIG. 6. In both instances, the sprag members 30' and 30" now include a pair of spaced peripheral contact surfaces having a radius $R_1$ as shown in FIG. 4B and consisting of the surfaces 42 and 44.

It is not essential that a 3-D sprag system be comprised of a combination of flat and rounded contact surfaces as configured in FIG. 4B, nor is it necessary that the sprag member 30 be a male-type member while the drive members 32 and the reaction member 34 be female type members.

FIGS. 7A–7D, for example, disclose four variations of surface contact configurations of FIG. 4B for a male sprag and a female type reaction member. In FIG. 7A, the sprag member $30_a$ includes a pair of convex contact surfaces 42 and 44 such as shown in FIG. 4B; however, the reaction member 34a, includes a pair of convex contact surfaces 60 and 62 in the groove 55a instead of the flat contact surfaces 52 and 54. As to the arrangement shown in FIG. 7B, the sprag member $30_b$ includes a pair of convex contact surfaces 42 and 44 like that shown in FIG. 7A; however, the reaction member $34_b$ now includes a pair of concave contact surfaces 64 and 66 in the groove $55_b$. With respect to the scheme shown in FIG. 7C, the sprag member $30_c$ includes a pair of flat contact surfaces 68 and 70, while the reaction member $34_c$ includes a pair of convex contact surfaces 60 and 62 such as shown in FIG. 7A. In FIG. 7D, the configuration is shown where the sprag member $30_d$ includes a pair of concave contact surfaces 72 and 74, while the reaction member $34_d$ includes a pair of convex contact surfaces 60 and 62 in the groove $55_d$.

Turning attention now to FIGS. 8A–8D, female type sprag members $30_e \ldots 30_h$ engage male type reaction members $34_e \ldots 34_h$. In FIG. 8A, there is shown a female type sprag member $30_e$ including a pair of convex surfaces 76 and 78 in a groove 80e, while the male type reaction member $34_e$ includes a pair of convex contact surfaces 82 and 84. In the embodiment of FIG. 8B, the reaction member 30f also includes a pair of convex contact surfaces 76 and 78, while the sprag member 34f includes a pair of flat contact surfaces 86 and 88. As to the embodiment of FIG. 8C, it discloses a reaction member 30g having a pair of concave contact surfaces 90 and 92 which abut a pair of convex contact surfaces 82 and 84 on the sprag member 34g. When desirable, both sets of contact surfaces 90, 92 and 82, 84 may comprise continuous curved surfaces. Finally, with respect to the embodiment shown in FIG. 8D, it depicts a reaction member $30_h$ having a pair of convex contact surfaces 76 and 78 in a reaction member groove $80_h$ and which are adapted to contact a pair of concave contact surfaces 94 and 96 in the sprag member $34_h$.

It should be noted that it is possible to have any number of variations of the schemes shown in FIGS. 7A–7D and 8A–8D. For example, one can have the top of the sprag as a groove, and the bottom as a male member which will mate with corresponding ridges and grooves in the reaction and drive members, respectively, or vice versa. Also, the contact angles of the top and bottom of the sprags can be different, depending upon the performance desired.

Having thus shown and described what is at present considered to be the preferred embodiments of the invention, it should be noted that the same has been made by way of illustration and not limitation. Accordingly, all alterations, modifications and changes coming within the spirit and scope of the invention are herein meant to be included.

I claim:

1. A torque coupling sprag system, comprising:

a drive member selected from a male type and a female type member, said drive member including a first pair of mutually spaced apart and mutually inclined contact surfaces for directly contacting a sprag member, said sprag member having an outermost perimeter located in a plane normal to an axis of rotation of said sprag member, a reaction member including a second pair of mutually spaced apart and mutually inclined contact surfaces for directly contacting said sprag member, and said sprag member selected from a male type and a female type member opposite said selection of said drive member and said reaction member and located between and biased against said pairs of contact surfaces of both said drive member and said reaction member and having a third pair of mutually spaced apart contact surfaces in direct contact with said first pair of contact surfaces of said drive member and a fourth pair of mutually spaced apart contact surfaces in direct contact with said second pair of contact surfaces of said reaction member, at a location radially inside said outermost perimeter of said sprag member, and wherein one pair of contact surfaces of said first and third pairs of contact surfaces and one pair of contact surfaces of said second and fourth pairs of contact surfaces, respectively, comprise curved contact surfaces having a predetermined radius of curvature, and wherein said sprag member comprises a rotatable member having a radius of rotation and wherein said radius of curvature of said third and fourth pairs of contact surfaces is relatively large relative to said radius of rotation.

2. A sprag system in accordance with claim 1 wherein said sprag member comprises a member rotatable about said axis of rotation and said reaction member is inclined relative to said drive member and forming an angle therebetween defined by a straight line passing through said axis of rotation and said first and third pairs of contact surfaces and a straight line passing through said axis of rotation and said second and fourth pairs of contact surfaces.

3. A sprag system in accordance with claim 2 wherein said third and fourth pair of contact surfaces of said sprag member have a contact radius of curvature of a first value for contacting said first and second pair of contact surfaces of said drive member and said reaction member, respectively, and said sprag member has a radius of rotation about said axis of rotation of a second value where said third and fourth pairs of contact surfaces make contact with said first and second pairs of contact surfaces, wherein said contact radius of curvature being determined and shaped independently of said radius of rotation and said first value is greater than said second value.

4. A sprag system in accordance with claim 3 wherein $R_2 \gg R_1$, where $R_1$ is the radius of rotation, and $R_2$ is the contact radius of curvature.

5. A sprag system in accordance with claim 4 wherein said first and second pairs of contact surfaces are located in grooves in an outer surface of said drive member and said reaction member, respectively, and wherein said third and fourth pairs of contact surfaces are respectively located on peripheral portions of said sprag member.

6. A sprag system in accordance with claim 5 wherein said grooves include pairs of flat surface segments in said drive member and said reaction member, said first and second pairs of contact surfaces respectively located on said flat surface segments, and wherein said peripheral portions of said sprag member include a pair of convex surface segments, said third and fourth pairs of contact surfaces respectively located on said convex surface segments.

7. A sprag system in accordance with claim 5 wherein said grooves include pairs of concave surface segments in said drive member and said reaction member, said first and second pairs of contact surfaces being respectively located on said concave surface segments, and wherein said peripheral portions of said sprag member include a pair of convex surface segments, said third and fourth pairs of contact surfaces being respectively located on said convex surface segments.

8. A sprag system in accordance with claim 5 wherein said grooves include pairs of convex surface segments in said drive member and said reaction member, said first and second pairs of contact surfaces respectively located on said convex surface segments, and wherein said peripheral portions of said sprag member include a pair of flat surface segments, said third and fourth pairs of contact surfaces respectively located on said flat surface segments.

9. A sprag system in accordance with claim 5 wherein said grooves include pairs of convex surface segments, in said drive member and said reaction member, said first and second pairs of contact surfaces respectively located on said convex surface segments, and wherein said tapered peripheral portions include a pair of concave surface segments, said third and fourth pairs of contact surfaces respectively located on said concave surface segments.

10. A sprag system in accordance with claim 4 wherein said first and second pairs of contact surfaces are located in peripheral outer surface portions of said drive member and said reaction member, respectively, and wherein said third and fourth pairs of contact surfaces are located in a groove in an outer surface of said sprag member.

11. A sprag system in accordance with claim 10 wherein said peripheral outer surface portions of said drive member and said reaction member respectively include a pair of convex surface segments, said first and second pairs of contact surfaces respectively located on said convex surface segments, and wherein said groove in said sprag member include a pair of convex surface segments and said third and fourth pairs of contact surfaces are respectively located on said pair of convex surface segments.

12. A sprag system in accordance with claim 10 wherein said peripheral outer surface portions of said drive member and said reaction member respectively include a pair of flat surface segments, said first and second pairs of contact surfaces respectively located on said flat surface segments, and wherein said groove in said sprag member includes a pair of convex surface segments and said third and fourth pairs of contact surfaces are respectively located on said pair of convex surface segments.

13. A sprag system in accordance with claim 10 wherein said peripheral outer surface portions of said drive member and said reaction member respectively include a pair of convex surface segments, said first and second pairs of contact surfaces respectively located on said convex surface segments, and wherein said groove in said sprag member includes a pair of concave surface segments and said third and fourth pairs of contact surfaces are respectively located on said pair of concave surface segments.

14. A sprag system in accordance with claim 10 wherein said peripheral outer surface portions of said drive member and said reaction member respectively include a pair of concave surface segments, said first and second pairs of contact surfaces respectively located on said concave surface segments, and wherein said groove in said sprag member includes a pair of convex surface segments and said third and fourth pairs of contact surfaces are respectively located on said pair of convex surface segments.

15. A sprag system in accordance with claim 4 wherein said sprag member comprises a roller member.

16. A sprag system in accordance with claim 4 wherein at least one pair of said pairs of contact surfaces include flat surface segments and wherein an adjoining pair of contact surfaces include curved surface segments.

17. A sprag system in accordance with claim 4 wherein at least one pair of said first and second pairs of contact surfaces are located in grooves in an outer surface of said drive member and said reaction member respectively and wherein said third and fourth pairs of contact surfaces are respectively located on a tapered peripheral portion of said sprag member.

18. A sprag system in accordance with claim 3 wherein at least one of said first and second pairs of contact surfaces comprise a pair of diametrically opposing contact surfaces.

19. A sprag system in accordance with claim 3 wherein at least one of said third and fourth pairs of contact surfaces comprise a pair of diametrically opposing contact surfaces.

20. A sprag system in accordance with claim 1 wherein said drive and reaction members comprise female members and said sprag member comprises a male member.

21. A sprag system in accordance with claim 1 wherein said drive and reaction members comprise male members and said sprag members comprise a female member.

22. A torque coupling sprag system, comprising:
a drive member including a sprag contact surface having a first pair of mutually spaced apart contact surface regions,
a reaction member including a sprag contact surface having a second pair of mutually spaced apart contact surface regions, and
a sprag member located between and biased against said drive member and said reaction member, said sprag member having an outermost perimeter located in a plane normal to an axis of rotation of said sprag member and having a third pair of mutually spaced apart contact surface regions complementary with and in direct contact with said first pair of contact surface regions of said drive member at a location radially inside said outermost perimeter of said sprag member, and having a fourth pair of mutually spaced apart contact surface regions complementary with and in direct contact with said second pair of contact surface regions of said reaction member, and
wherein one pair of contact surfaces of said first and third pairs of contact surfaces and one pair of contact surfaces of said second and fourth pairs of contact surfaces, respectively, comprise curved contact surfaces having a predetermined radius of curvature, and
wherein said sprag member comprises a rotatable member having a radius of rotation and wherein said radius of curvature of said third and fourth pairs of contact surfaces is relatively large relative to said radius of rotation.

23. A sprag system in accordance with claim 22 wherein said first and second pairs of contact surface regions are respectively located in at least one recess formed in said drive member and said reaction member, and wherein said third and fourth pairs of contact surface regions are respectively located on a tapered peripheral outer portion of said sprag member.

24. A sprag system in accordance with claim 22 wherein said first and second pairs of contact surface regions are respectively located on tapered peripheral outer portions of said drive member and said reaction member, and wherein said third and fourth pairs of contact surface regions are respectively located in at least one recess formed in an outer peripheral surface of said sprag member.

25. A sprag system in accordance with claim 22 wherein at least one pair of said first and second pairs of contact surface regions is located in a recess selectively formed in said drive member or said reaction member, and wherein at least one pair of said third and fourth pairs of contact surface regions is selectively located on a tapered peripheral outer portion of said sprag member.

26. A sprag system in accordance with claim 22 wherein at least one pair of said first and second pairs of contact surface regions is located on a tapered peripheral outer portion of said drive member or said reaction member, and wherein at least one pair of said third and fourth pairs of contact surface regions is located in a recess selectively formed in said sprag member.

27. A torque coupling sprag system in accordance with claim 22 wherein said sprag member comprises a member rotatable about said axis of rotation and said reaction member is inclined relative to said drive member and forming an angle therebetween defined by a straight line passing through said axis of rotation and said first and third pairs of contact surfaces and a straight line passing through said axis of rotation and said second and fourth pairs of contact surfaces.

* * * * *